United States Patent
Smith et al.

(10) Patent No.: US 8,567,175 B2
(45) Date of Patent: Oct. 29, 2013

(54) EMISSIONS PREDICTION SYSTEM FOR POWER GENERATION SYSTEM

(75) Inventors: Gordon Raymond Smith, Ballston Spa, NY (US); Kelvin Rafael Estrada, Norcross, GA (US)

(73) Assignee: General Electric Company, Schenectady, NY (US)

( * ) Notice: Subject to any disclaimer, the term of this patent is extended or adjusted under 35 U.S.C. 154(b) by 109 days.

(21) Appl. No.: 13/214,915

(22) Filed: Aug. 22, 2011

(65) Prior Publication Data

US 2013/0047615 A1 Feb. 28, 2013

(51) Int. Cl.
*F02C 6/00* (2006.01)
*F01K 13/02* (2006.01)

(52) U.S. Cl.
USPC .............. 60/39.182; 60/646; 60/657; 60/660; 422/62; 422/108; 700/274; 700/299

(58) Field of Classification Search
USPC ............... 60/39.182, 39.24, 39.26, 39.3, 646, 60/657, 660; 422/62, 108–109; 700/274, 700/299
See application file for complete search history.

(56) References Cited

U.S. PATENT DOCUMENTS

| | | | |
|---|---|---|---|
| 4,473,536 A * | 9/1984 | Carberg et al. ............ | 423/239.1 |
| 6,978,620 B2 | 12/2005 | Cooper et al. | |
| 2007/0250215 A1* | 10/2007 | Jia et al. ..................... | 700/274 |
| 2009/0071118 A1* | 3/2009 | Ma et al. ..................... | 60/39.26 |
| 2009/0292436 A1 | 11/2009 | D'Amato et al. | |

OTHER PUBLICATIONS

GE Energy, "Allowable Steam to Metal Temperature Mismatch Combined Cycle Units (A,D, and SC Code Types)," Jul. 2005, 4 pages, General Electric Company.

* cited by examiner

*Primary Examiner* — Hoang Nguyen
(74) *Attorney, Agent, or Firm* — Ernest G. Cusick; Hoffman Warnick LLC

(57) ABSTRACT

A system configured to decrease the emissions of a power plant system during transient state operation is disclosed. In one embodiment, a system includes: at least one computing device adapted to adjust a temperature of an operational steam in a power generation system by performing actions comprising: obtaining operational data about components of a steam turbine in the power generation system, the operational data including at least one of: a temperature of the components and a set of current ambient conditions at the power generation system; determining an allowable operational steam temperature range for the steam turbine based upon the operational data; generating emissions predictions for a set of temperatures within the allowable steam temperature range; and adjusting the temperature of the operational steam based upon the emissions predictions.

19 Claims, 6 Drawing Sheets

EMISSIONS PREDICTION SYSTEM FOR POWER GENERATION SYSTEM

BACKGROUND OF THE INVENTION

The subject matter disclosed herein relates to power plant systems and, more particularly, to systems for emissions sensitive transient state operation of a combined-cycle power plant system.

The operation of some power plant systems, for example certain simple-cycle and combined-cycle power plant systems, produce emissions (i.e. Carbon Monoxide (CO), hydrocarbons (UHC), Nitrogen Oxide (NOx) etc.) which must be released/dissipated into the atmosphere. The release of these emissions may damage the environment and/or be regulated by certain agencies. A significant quantity of these emissions may be generated during states of transient operation (e.g. start-up, shutdown, etc.), where operational steam temperatures are restricted and components of the power plant system may operate with decreased loads.

In combined-cycle power plant systems, a temperature of the steam supplied to the steam turbine during startup or other transient operation may be controlled by adjusting an operating parameter of the system (e.g., the gas turbine load, gas turbine exhaust temperature, etc.). During startup or other transient operation, the allowable operational steam temperature which may be supplied to the steam turbine is restricted to a temperature range which may be limited by the temperature of the steam turbine components. The steam temperatures within this allowable range are held close to the temperature of the system components so as to prevent against component binding and the formation of thermal stresses. In determining this temperature range and the appropriate operational steam temperature, current power plant systems consider a number of factors (e.g. effect on start-up and/or cool-down time, material effects on components, etc.). However, these systems are blind to emissions variances which may exist within the allowable steam temperature range. As such, emissions effects are not considered when adjusting operating parameters, such as the gas turbine load, to attain an operational steam temperature for transient state operation.

BRIEF DESCRIPTION OF THE INVENTION

Systems for decreasing the emissions of a power plant system are disclosed. In one embodiment, a system includes: at least one computing device adapted to adjust a temperature of an operational steam in a power generation system by performing actions comprising: obtaining operational data about components of a steam turbine in the power generation system, the operational data including at least one of: a temperature of the components and a set of current ambient conditions at the power generation system; determining an allowable operational steam temperature range for the steam turbine based upon the operational data; generating emissions predictions for a set of temperatures within the allowable steam temperature range; and adjusting the temperature of the operational steam based upon the emissions predictions.

A first aspect of the invention provides a system including: at least one computing device adapted to adjust a temperature of an operational steam in a power generation system by performing actions comprising: obtaining operational data about components of a steam turbine in the power generation system, the operational data including at least one of: a temperature of the components and a set of current ambient conditions at the power generation system; determining an allowable operational steam temperature range for the steam turbine based upon the operational data; generating emissions predictions for a set of temperatures within the allowable steam temperature range; and adjusting the temperature of the operational steam based upon the emissions predictions.

A second aspect of the invention provides a program product stored on a computer readable medium, which when executed by at least one computing device, performs the following: obtains operational data about components of a steam turbine in a power generation system, the operational data including at least one of: a temperature of the components and a set of current ambient conditions at the power generation system; determines an allowable operational steam temperature range for the steam turbine based upon the operational data; generates emissions predictions for a set of temperatures within the allowable steam temperature range; and adjusts the temperature of an operational steam in the power generation system based upon the emissions predictions.

A third aspect of the invention provides a combined cycle power generation system including: a gas turbine; a heat recovery steam generator (HRSG) operatively connected to the gas turbine; a steam turbine operatively connected to the HRSG; a generator operatively connected to at least one of the gas turbine or the steam turbine; and at least one computing device communicatively connected to at least one of the gas turbine, the steam turbine and the HRSG, the at least one computing device adapted to adjust a temperature of an operational steam in the power generation system by performing actions comprising: obtaining operational data about components of the steam turbine, the operational data including at least one of: a temperature of the components and a set of current ambient conditions at the power generation system; determining an allowable operational steam temperature range for the steam turbine based upon the operational data; generating emissions predictions for a set of temperatures within the allowable steam temperature range; and adjusting the temperature of the operational steam based upon the emissions predictions.

BRIEF DESCRIPTION OF THE DRAWINGS

These and other features of this invention will be more readily understood from the following detailed description of the various aspects of the invention taken in conjunction with the accompanying drawings that depict various embodiments of the invention, in which.

Figure 1:
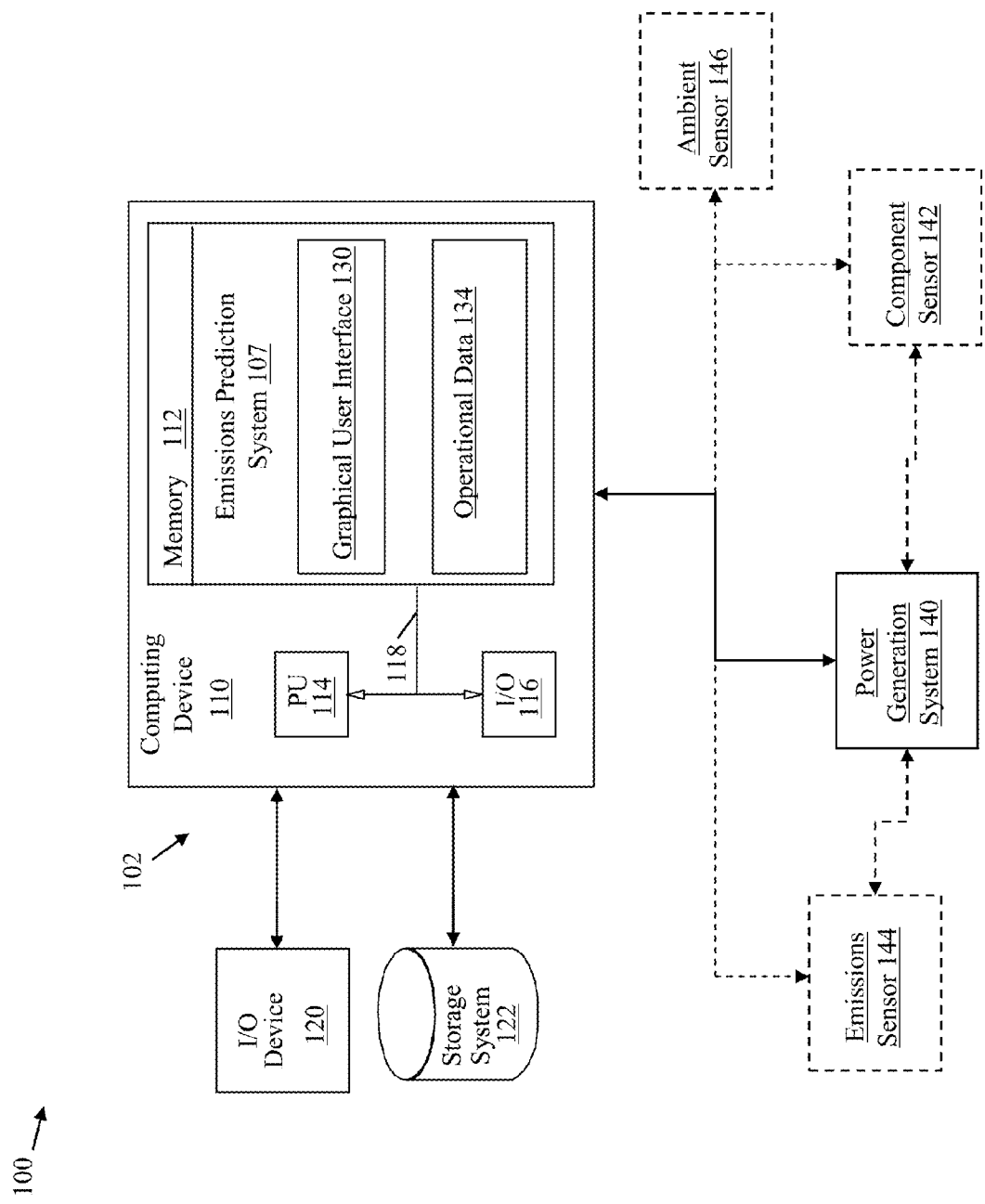
FIG. 1 shows a schematic illustration of an environment including a control system in accordance with an embodiment of the invention.

It is noted that the drawings of the disclosure may not necessarily be to scale. The drawings are intended to depict only typical aspects of the disclosure, and therefore should not be considered as limiting the scope of the disclosure. In the drawings, like numbering represents like elements between the drawings.

DETAILED DESCRIPTION OF THE INVENTION

As indicated herein, aspects of the invention provide for systems configured to decrease the emissions of a power plant system during transient state operation. These systems predict the available improvement and/or deterioration of emissions outputs available within the allowable steam temperature matching range, and factor these effects into the steam temperature matching decision.

Transient state operation of some power generation systems (including, e.g., steam turbines, gas turbines, etc.), may include regulation and incremental adjustment of an operational steam temperature. This regulation and/or adjustment must keep the steam temperature within a certain range of the temperature of the system components to avoid the formation of thermal stresses. Typically, in determining the allowable steam temperature range and adjusting the system operating parameters (e.g., gas turbine load, gas turbine exhaust temperature, etc.) to match the decided upon operational steam temperature, power generation systems consider the effects on system efficiency and component material limits. However, current systems do not factor or consider emissions effects into the selection of an operational steam temperature and/or the resulting gas turbine operating condition. This lack of emissions consideration during the temperature matching process may increase the emissions output of the power generation system.

In contrast to the conventional system, embodiments of the current invention provide for a system which predicts and considers the effects on emissions totals of a set of operational steam temperatures and corresponding gas turbine operating parameters/conditions within the allowable temperature matching range. The system includes a computing device which is communicatively connected to a database/memory/storage system and at least one sensor. The computing device is configured to identify an allowable steam temperature matching range for the power generation system based upon the temperature of the system components. Once the range has been identified, the computing device considers the gas turbine operating condition(s) necessary to achieve the various temperatures within the range, and predicts the effects that these condition(s) will have on emissions totals. As the effects on emissions of various steam temperatures are determined and factored into the matching decision, a temperature match may be made which reduces transient state emissions totals and overall plant emissions totals.

As will be appreciated by one skilled in the art, the control system described herein may be embodied as a system(s), method(s), operator display(s) or computer program product (s), e.g., as part of a power plant system, a power generation system, a turbine system, etc. Accordingly, embodiments of the present invention may take the form of an entirely hardware embodiment, an entirely software embodiment (including firmware, resident software, micro-code, etc.) or an embodiment combining software and hardware aspects that may all generally be referred to herein as a "circuit," "module," "network" or "system." Furthermore, the present invention may take the form of a computer program product embodied in any tangible medium of expression having computer-usable program code embodied in the medium.

Any combination of one or more computer usable or computer readable medium(s) may be utilized. The computer-useable or computer-readable medium may be, for example but not limited to, an electronic, magnetic, optical, electromagnetic, infrared, or semiconductor system, apparatus, or device. More specific examples (a non-exhaustive list) of the computer-readable medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a transmission media such as those supporting the Internet or an intranet, or a magnetic storage device. Note that the computer-usable or computer-readable medium could even be paper or another suitable medium upon which the program is printed, as the program can be electronically captured, via, for instance, optical scanning of the paper or other medium, then compiled, interpreted, or otherwise processed in a suitable manner, if necessary, and then stored in a computer memory. In the context of this document, a computer-usable or computer-readable medium may be any medium that can contain, store, communicate, or transport the program for use by or in connection with the instruction execution system, apparatus, or device. The computer-usable medium may include a propagated data signal with the computer-usable program code embodied therewith, either in baseband or as part of a carrier wave. The computer usable program code may be transmitted using any appropriate medium, including but not limited to wireless, wireline, optical fiber cable, RF, etc.

Computer program code for carrying out operations of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

These computer program instructions may also be stored in a computer-readable medium that can direct a computer or other programmable data processing apparatus to function in a particular manner, such that the instructions stored in the computer-readable medium produce an article of manufacture including instruction means which implement the function/act specified in the block diagram block or blocks.

The computer program instructions may also be loaded onto a computer or other programmable data processing apparatus to cause a series of operational steps to be performed on the computer or other programmable apparatus to produce a computer implemented process such that the instructions which execute on the computer or other programmable apparatus provide processes for implementing the functions/acts specified in the flowchart and/or block diagram block or blocks.

Turning to the FIGURES, embodiments of a system configured to enable emissions sensitive transient state operation of a combined-cycle power plant system, by including emissions effects in the temperature matching process are shown. Each of the components in the FIGURES may be connected via hardwired, wireless, or other conventional means as is indicated in FIGS. 1-5. Specifically, referring to FIG. 1, an illustrative environment 100 including an emissions prediction system 107 is shown according to embodiments of the invention. Environment 100 includes a computer infrastructure 102 that can perform the various processes described herein. In particular, computer infrastructure 102 is shown including computing device 110 which includes emissions prediction system 107, which enables computing device 110 to manage emissions sensitive transient state operation of a power generation system 140 by performing the process steps of the disclosure.

As previously mentioned and discussed further below, emissions prediction system 107 has the technical effect of enabling computing device 110 to perform, among other things, the emissions sensitive control operations described herein. It is understood that some of the various components shown in FIG. 1 can be implemented independently, combined, and/or stored in memory for one or more separate computing devices that are included in computing device 110. Further, it is understood that some of the components and/or functionality may not be implemented, or additional schemas and/or functionality may be included as part of emissions prediction system 107.

Computing device 110 is shown including a memory 112, a processor unit (PU) 114, an input/output (I/O) interface 116, and a bus 118. Further, computing device 110 is shown in communication with an external I/O device/resource 120 and a storage system 122. As is known in the art, in general, PU 114 executes computer program code, such as emissions prediction system 107, that is stored in memory 112 and/or storage system 122. While executing computer program code, PU 114 can read and/or write data, such as graphical user interface 130 and/or operational data 134, to/from memory 112, storage system 122, and/or I/O interface 116. Bus 118 provides a communications link between each of the components in computing device 110. I/O device 120 can comprise any device that enables a user to interact with computing device 110 or any device that enables computing device 110 to communicate with one or more other computing devices. Input/output devices (including but not limited to keyboards, displays, pointing devices, etc.) can be coupled to the system either directly or through intervening I/O controllers.

In some embodiments, as shown in FIG. 1, environment 100 may optionally include at least one component sensor 142, at least one emissions sensor 144 and at least one ambient sensor 146 communicatively connected to power generation system 140 and computing device 110 (e.g., via wireless or hard-wired means). Component sensor 142, emissions sensor 144 and ambient sensor 146 may include any number of sensors as is known, including a thermometer, a barometer, a humidity sensing device, gas turbine instruments, steam turbine instruments, etc. In some embodiments, computing device 110 and/or emissions prediction system 107 may be disposed upon or within power generation system 140.

In any event, computing device 110 can comprise any general purpose computing article of manufacture capable of executing computer program code installed by a user (e.g., a personal computer, server, handheld device, etc.). However, it is understood that computing device 110 is only representative of various possible equivalent computing devices that may perform the various process steps of the disclosure. To this extent, in other embodiments, computing device 110 can comprise any specific purpose computing article of manufacture comprising hardware and/or computer program code for performing specific functions, any computing article of manufacture that comprises a combination of specific purpose and general purpose hardware/software, or the like. In each case, the program code and hardware can be created using standard programming and engineering techniques, respectively. In one embodiment, computing device 110 may be/include a distributed control system. In another embodiment, computing device 110 may be integral to a gas turbine. In another embodiment, computing device 110 may be a part of power generation system 140.

Figure 2A:
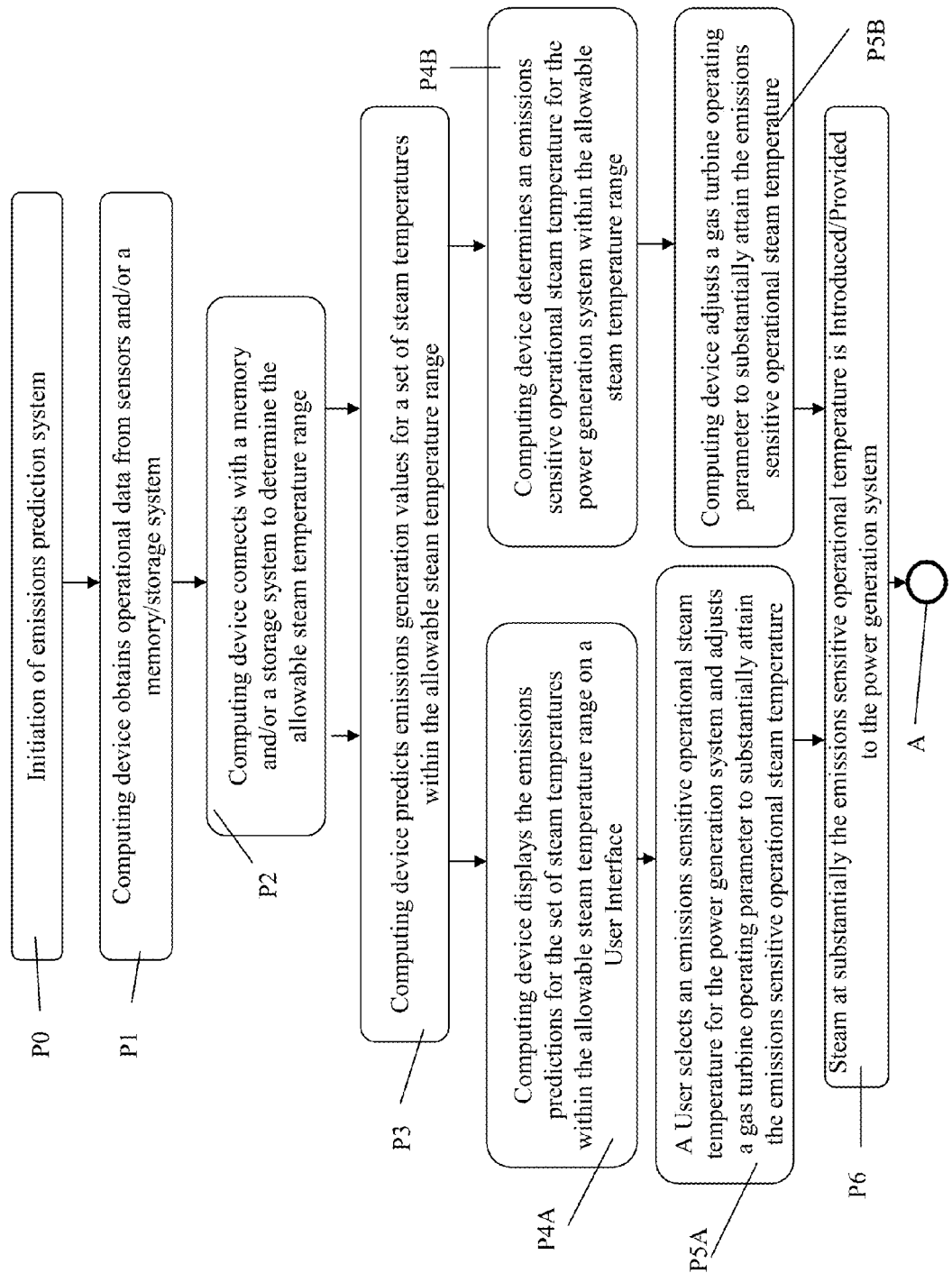
FIG. 2A shows a method flow diagram illustrating a process according to embodiments of the invention.

Turning to FIG. 2A, an illustrative method flow diagram is shown according to embodiments of the invention: In pre-process P0, emission prediction system 107 is initiated on computing device 110 to begin emissions sensitive steam temperature matching for transient state operation of power generation system 140. That is, either an automatic/scheduled adjustment to the operational steam temperature of power generation system 140, a condition dictated adjustment to the operational steam temperature of power generation system 140 or a manual/user-commanded adjustment of the steam temperature may be performed by computing device 110. Following pre-process P0, in process P1, computing device 110 obtains operational data for at least one component of power generation system 140. Operational data may be obtained from at least one of: memory 112, storage system 122, component sensor 142, emissions sensor 144 and/or ambient sensor 146. Operational data may include a temperature of the at least one component, a temperature of a steam turbine in power generation system 140, a set of system specifications for power generation system 140, a set of current ambient conditions at the power generation system 140, steam turbine stress, steam turbine expansion, steam turbine clearances etc. Following process P1, in process P2, computing device 110 connects with memory 112 and/or storage system 122, to access prediction reference data (e.g. a look-up table, a pre-generated curve, steam turbine design basis, etc.), to determine the allowable steam temperature range based upon the operational data obtained from power generation system 140.

In any event, following the process of P2, in process P3, computing device 110 predicts emissions generation values for various steam temperatures and/or corresponding gas turbine operating condition(s) within a selected gas turbine load or other operating parameter range. The range of the selected gas turbine operating condition(s) including but not necessarily limited to the determined allowable steam temperature range. In one embodiment, computing device 110 and/or PU 114 may access any of: an emissions look-up table, a pre-generated emissions curve and/or stored emissions data. Computing device 110 and/or PU 114 may compare the allowable steam temperature, corresponding gas turbine operating parameter(s) range and/or operational data to data points in any of the emissions look-up table, the pre-generated emissions curve and/or stored data to generate emissions predictions for a set of temperatures and/or corresponding gas turbine operating parameter(s) ranges. The corresponding gas turbine operating parameter(s) ranges including but not limited to the allowable operational steam temperature range. Computing device 110 and/or PU 114 may input operational data and the allowable steam temperature range and/or a given temperature within the allowable steam temperature range into memory 112 and/or storage system 122 to obtain/generate emissions predictions for a set of temperatures within the allowable operational steam temperature range.

Following P3, in process P4A, computing device 110 displays the emissions predictions for the set of steam temperatures and/or corresponding gas turbine operating condition(s) within the allowable steam temperature range on a graphical user interface 130. In one embodiment, computing device 110 may display the emissions predictions as a set of curves. In another embodiment, computing device 110 may display the emissions predictions as a set of data points within a table. In one embodiment, graphical user interface 130 may include other power generation system 140 or turbine parameters as would be valuable for operator guidance in system and/or power plant operation. Following P4A, in process P5A, a user selects and/or is prompted to select an emissions sensitive operational steam temperature and/or gas turbine operating condition, and, in response to a user selection, computing device 110 adjusts the gas turbine operating parameter(s) to substantially attain the emissions sensitive operational steam temperature and/or selected gas turbine operating condition. Alternatively, in process P4B, computing device 110 determines an emissions sensitive operational steam temperature for the power generation system. In one embodiment, computing device 110 determines the emissions sensitive operational steam temperature by accessing an emissions prediction reference data set on memory 112 and/or storage system 122. Computing device 110 compares the data points in the emissions prediction reference data set to the obtained operational data and the determined allowable operational steam temperature range. In another embodiment, computing device 110 may compare emissions predictions for a set of operational steam temperatures to determine an emissions sensitive operational steam temperature. In any event, following P4B, in process P5B, computing device 110 adjusts the gas turbine operating parameter(s) to substantially attain the determined emissions sensitive operational steam temperature. In one embodiment, computing device 110 may automatically adjust the gas turbine operating parameter(s). In another embodiment, computing device 110 may prompt and await user approval before adjusting the gas turbine operating parameter(s). In any event, following either of P5A or P5B, in process P6, an operational steam flow is either introduced to the steam turbine or an already existing operational steam flow to the steam turbine is altered. The new or altered operational steam flow is introduced at a temperature substantially equivalent to the emissions sensitive temperature.

Figure 2B:
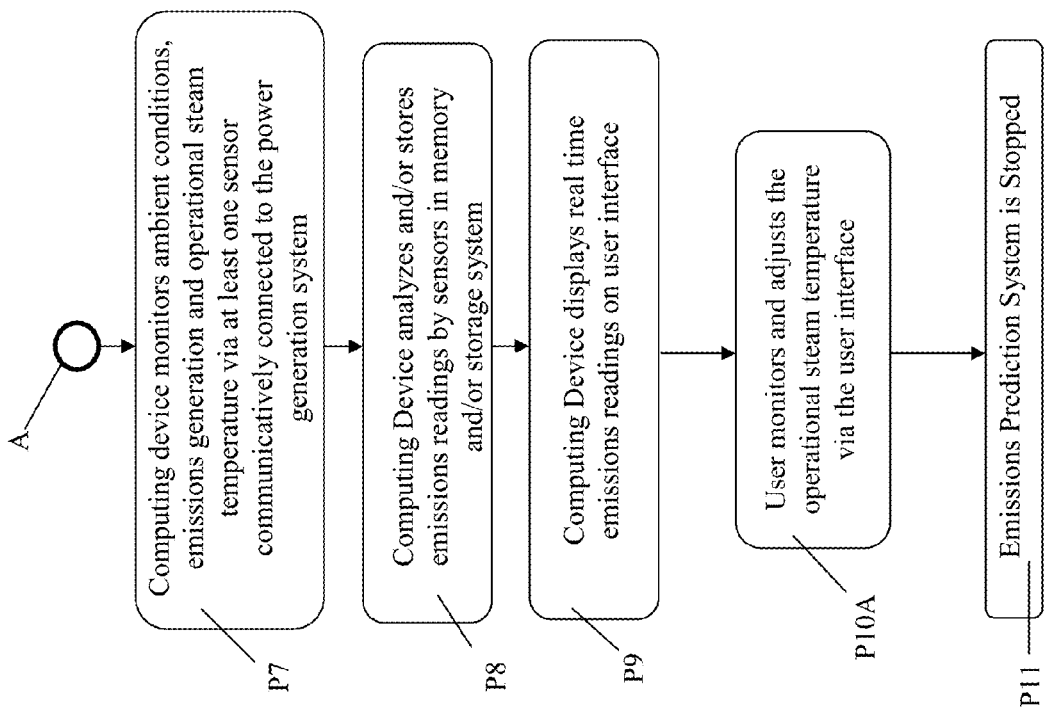
FIG. 2B shows a method flow diagram illustrating a process according to embodiments of the invention.

Turning to FIG. 2B, following P6, in process P7, computing device 110 monitors emissions generation and operational steam temperature of power generation system 140 via component sensor 142, emissions sensor 144, and ambient sensor 146. Component sensor 142, emissions sensor 144 and ambient sensor 146 may be disposed upon, within or in fluid communication with power generation system 140. It is understood that component sensor 142, emissions sensor 144 and ambient sensor 146 may comprise any number of similar or varied sensors (e.g. pressure sensor, temperature sensor, humidity sensor, etc.). Component sensor 142, emissions sensor 144 and ambient sensor 146 may record/read operational data (e.g. component temperature, atmospheric temperature, barometric pressure, humidity, etc.) and/or emissions data (e.g. NOx, NO, NO2 generation, CO, CO2 generation, UHC, VOC generation, particulates generation, Gas Turbine exhaust temperature, steam temperature, etc.) for power generation system 140. Following process P7, in process P8, computing device 110 updates any of memory 112, storage system 122 and/or power system data 134 based upon readings by any of component sensor 142, emissions sensor 144 and ambient sensor 146. In one embodiment, these real-time readings are used to update operational data 134 and existing emissions predictions. These readings are saved in any of memory 112 and storage system 122 to enhance future emissions predictions by computing device 110. In one embodiment, these readings are factored into future emissions predictions by computing device 110. These readings being used by computing device 110 to generate a gas turbine emissions versus operating parameter(s) characteristic which may be used in real-time to adjust the operation of power generation system 140. In one embodiment, computing device 110 analyzes the emissions readings (e.g., determining an accuracy of the emissions predictions, monitoring emissions levels, etc.). In one embodiment, computing device 110 continues to predict emissions and adjust the operational steam temperature and corresponding gas turbine operating parameter(s) to substantially minimize emissions.

In any event, following process P8, in process P9, computing device 110 displays the real time emissions values obtained from sensor 142 and/or sensor 144 on graphical user interface 130. In one embodiment, the real time emissions values may be displayed comparatively with the emissions predictions on graphical user interface 130. In another embodiment, the real time emissions values may be factored into the emissions predictions to display updated emissions predictions on graphical user interface 130. In any event, following process P9, in process P10, a user monitors the real time emissions values and adjusted/updated emissions prediction values within the allowable operational steam temperature range on the graphical user interface 130. The user adjusts the operational steam temperature to attain an emissions sensitive operational steam temperature. In another embodiment, computing device 110 may automatically maintain an emissions sensitive operational steam temperature. Following P10, in process P11, the emissions prediction system 107 is stopped.

The data flow diagram and block diagrams in the FIGURES illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the FIGURES. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

Figure 3:
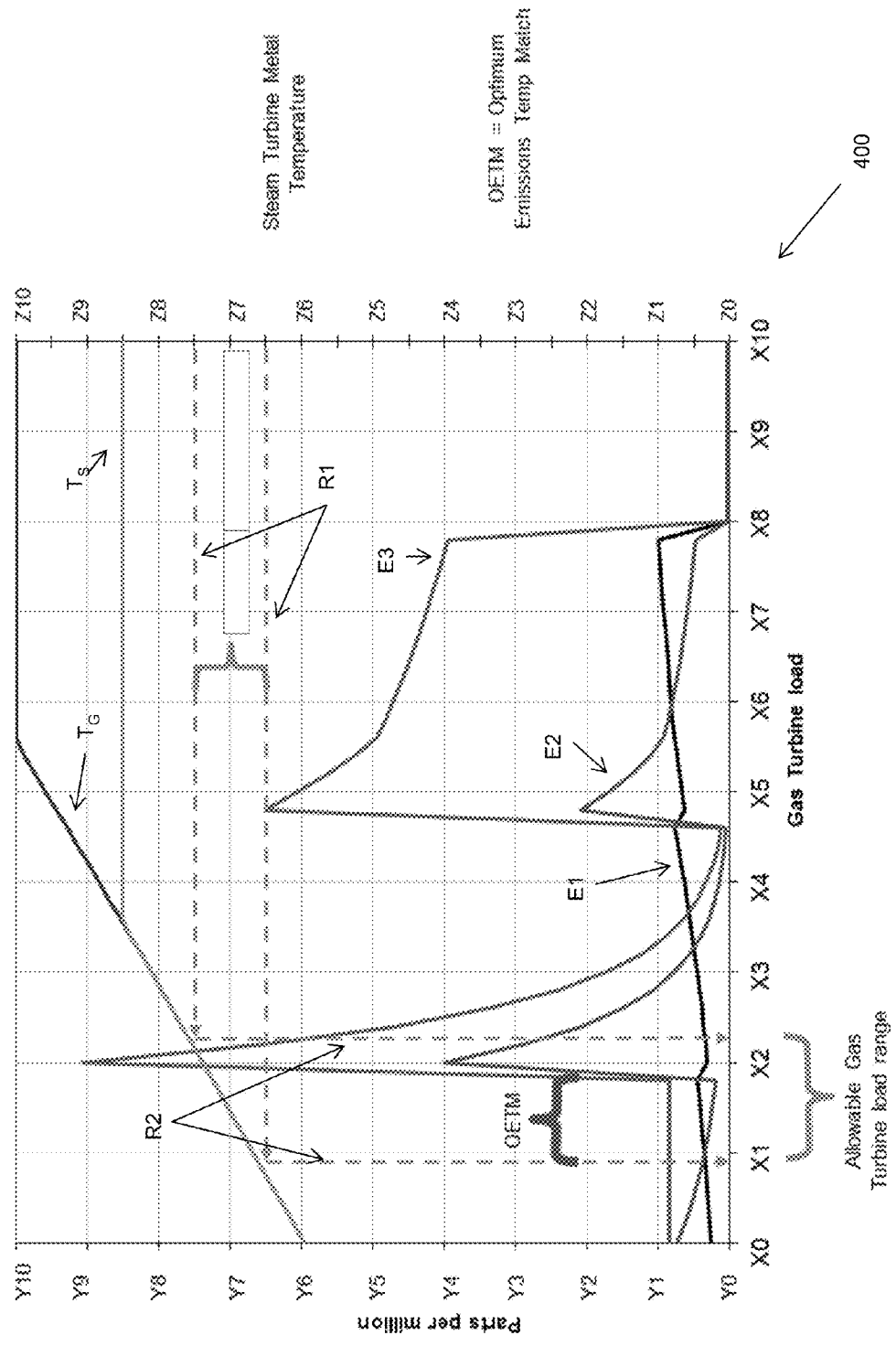
FIG. 3 shows a schematic illustration of a user interface according to embodiments of the invention.

Turning to FIG. 3, a schematic illustration of a User Interface (UI) 400 is shown according to embodiments of the invention. UI 400 includes Steam Temperature curve ($T_S$), Gas turbine exhaust temperature curve ($T_G$), Emissions substance curve 1 (E1), Emissions substance curve 2 (E2), and Emissions substance curve 3 (E3). In one embodiment, each emissions curve, E1, E2, and/or E3 may represent the predicted parts per million generation of a respective substance (Carbon monoxide, hydrocarbon, etc.) across a range of operating conditions. In this embodiment, the predicted parts per million generation of a substance may be represented across a range of Y0 to Y10 parts per million. In another embodiment, the emissions flow rate across a range of operating conditions may be displayed. In this embodiment, E1, E2, and E3, are shown with respect to a range of gas turbine loads X0 through X10 and a range of Steam Turbine Component Temperatures Z0 through Z10. In one embodiment, user interface 400 may include a graphically defined allowable steam temperature range R1 and a graphically defined allowable gas turbine load range R2. In one embodiment, R1 and R2 may be calculated by computing device 110 and/or retrieved from a database. In one embodiment, user interface 400 may include an Optimum Emissions Temperature Match (OETM) indicator, the OETM indicator for notifying a user/operator as to the load range of an emissions sensitive operational steam temperature. In one embodiment, the operator may select the OETM indicator on user interface 400 to adjust the operational steam temperature. It is understood that user interface 400 is only an exemplary embodiment of the invention, other forms, formats and/or styles of user interfaces may be included as is known in the art.

Figure 4:
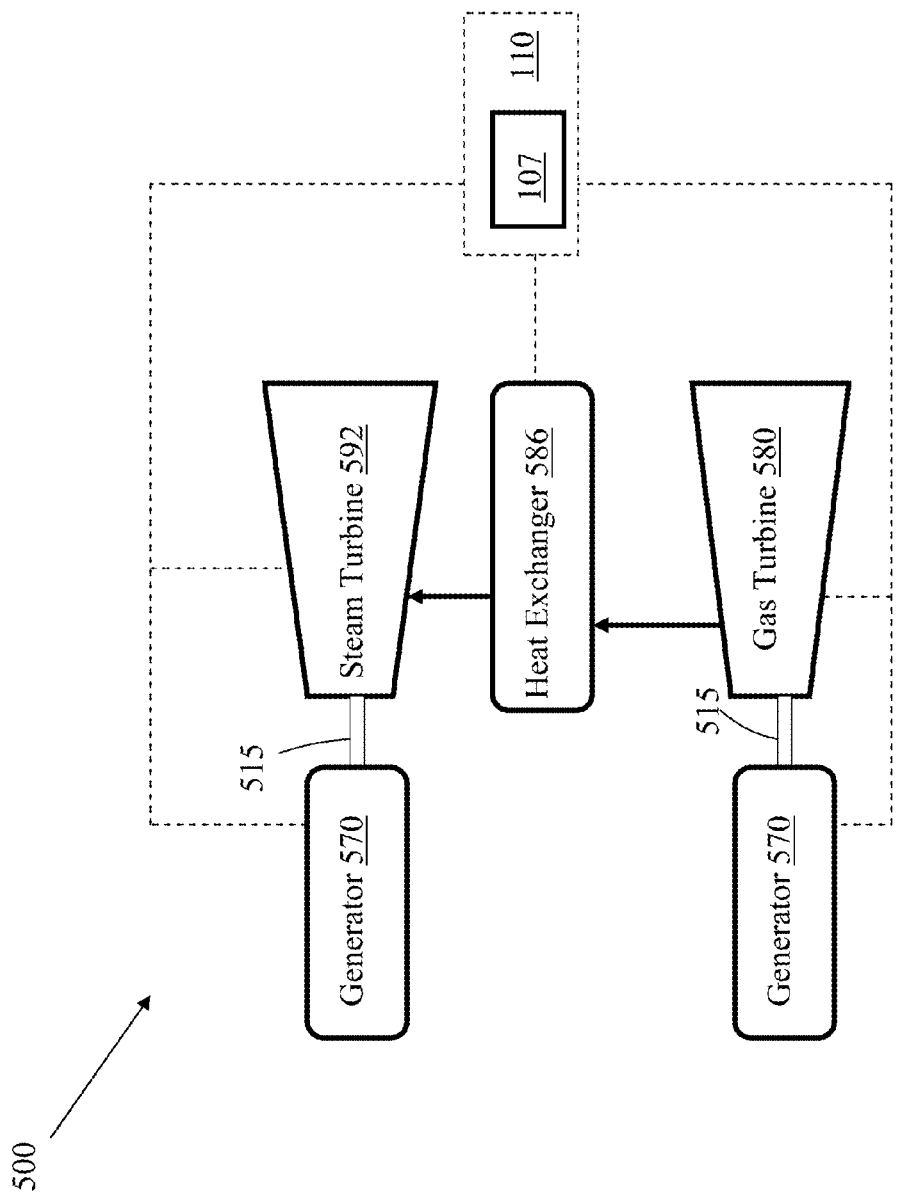
FIG. 4 shows a schematic view of portions of a multi-shaft combined cycle power plant in accordance with an aspect of the invention.
Figure 5:
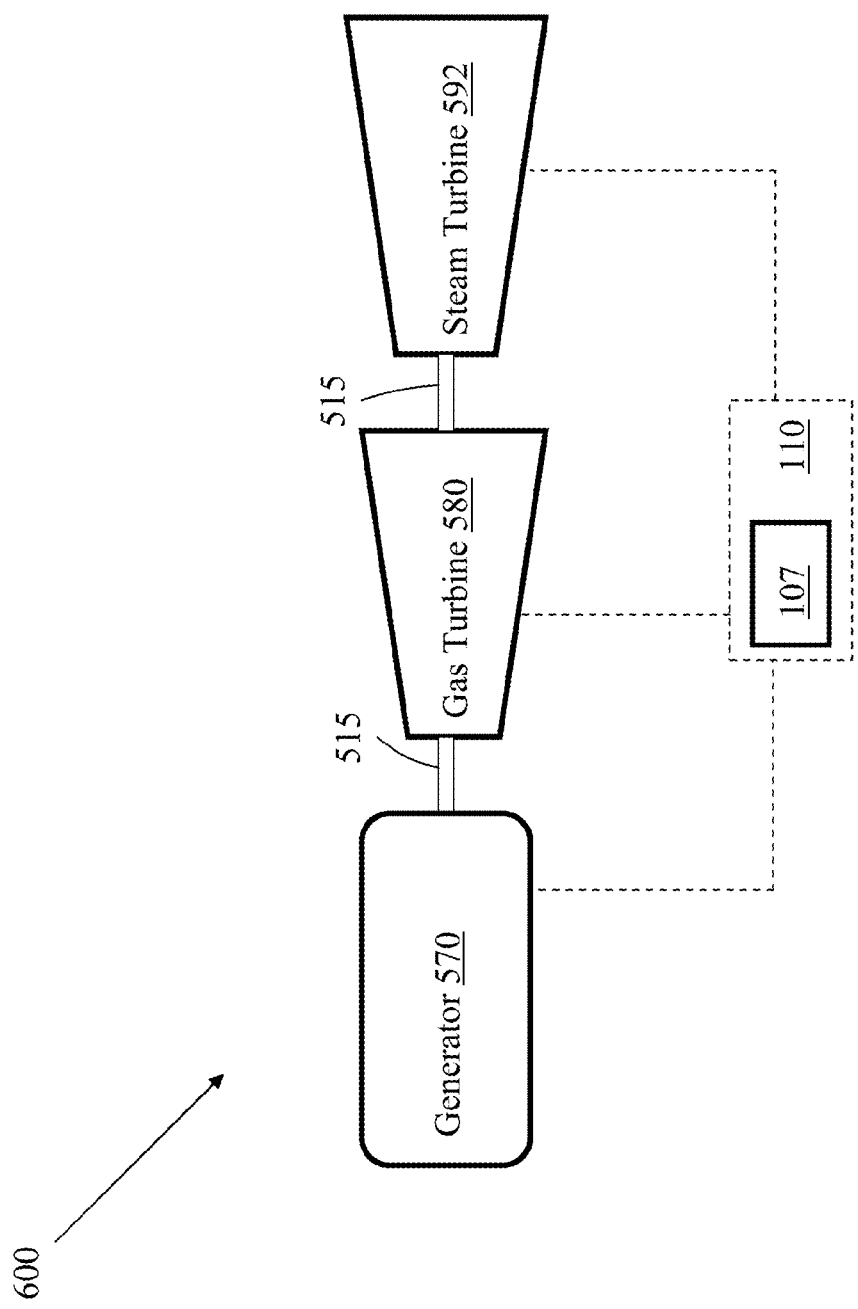
FIG. 5 shows a schematic view of portions of a single-shaft combined cycle power plant in accordance with an aspect of the invention.

Turning to FIG. 4, a schematic view of portions of a multi-shaft combined-cycle power plant 500 is shown. Combined-cycle power plant 500 may include, for example, a gas turbine 580 operably connected to a generator 570. Generator 570 and gas turbine 580 may be mechanically coupled by a shaft 515, which may transfer energy between a gas turbine 580 and generator 570. Also shown in FIG. 4 is a heat exchanger 586 operably connected to gas turbine 580 and a steam turbine 592. Heat exchanger 586 may be fluidly connected to both gas turbine 580 and steam turbine 592 via conventional conduits (numbering omitted). Heat exchanger 586 may be a conventional heat recovery steam generator (HRSG), such as those used in conventional combined-cycle power systems. As is known in the art of power generation, HRSG 586 may use hot exhaust from gas turbine 580, combined with a water supply, to create steam which is fed to steam turbine 592. Steam turbine 592 may optionally be coupled to a second generator system 570 (via a second shaft 515). Any of generator system 570, gas turbine 580, HRSG 586, and steam turbine 592 may be operably connected to emissions prediction system 107 via computing device 110 of FIG. 1 or other embodiments described herein. It is understood that generators 570 and shafts 515 may be of any size or type known in the art and may differ depending upon their application or the system to which they are connected. Common numbering of the generators and shafts is for clarity and does not necessarily suggest these generators or shafts are identical. Generator system 570 and second shaft 515 may operate substantially similarly to generator system 570 and shaft 515 described above. In one embodiment of the present invention (shown in phantom), emissions prediction system 107 may be used, via computing device 110 to operate either or both of steam turbine 592 and gas turbine 580. In another embodiment, shown in FIG. 5, a single-shaft combined-cycle power plant 600 may include a single generator 570 coupled to both gas turbine 580 and steam turbine 592 via a single shaft 515. Gas turbine 580 and steam turbine 592 may be operably connected to emissions prediction system 107 via computing device 110 of FIG. 1 or other embodiments described herein.

The emissions prediction system of the present disclosure is not limited to any one power generation system, combined cycle power generation system, turbine or other system, and may be used with other power systems. Additionally, the system of the present invention may be used with other systems not described herein that may benefit from the emissions sensitive transient operation provided by the emission prediction system described herein.

As discussed herein, various systems and components are described as "obtaining" and/or "transferring" data (e.g., operational data, component temperatures, system specifications, etc.). It is understood that the corresponding data can be obtained using any solution. For example, the corresponding system/component can generate and/or be used to generate the data, retrieve the data from one or more data stores or sensors (e.g., a database), receive the data from another system/component, and/or the like. When the data is not generated by the particular system/component, it is understood that another system/component can be implemented apart from the system/component shown, which generates the data and provides it to the system/component and/or stores the data for access by the system/component.

The terminology used herein is for the purpose of describing particular embodiments only and is not intended to be limiting of the disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal languages of the claims.

What is claimed is:

1. A system comprising:
    at least one computer including programming, which when executed performs a function of adjusting a temperature of an operational steam in a power generation system by performing actions comprising:
        obtaining operational data about components of a steam turbine in the power generation system, the operational data including at least one of: a temperature of the components and a set of current ambient conditions at the power generation system;
        determining an allowable operational steam temperature range for the steam turbine based upon the operational data;
        generating emissions predictions for a set of temperatures within the allowable steam temperature range; and
        adjusting the temperature of the operational steam based upon the emissions predictions.

2. The system of claim 1, wherein the adjusting of the temperature of the operational steam includes adjusting an operating parameter on a gas turbine in the power generation system.

3. The system of claim 1, wherein the at least one computer is further adapted to display the emissions predictions for the set of temperatures within the allowable steam temperature range on a user interface.

4. The system of claim 3, wherein the adjusting of the temperature of the operational steam further includes:
    prompting a user to select or approve of an emissions sensitive operational steam temperature via the user interface;
    receiving the selection or approval of the emissions sensitive operational steam temperature from the user via the user interface; and
    adjusting the temperature of the operational steam temperature to substantially attain the emissions sensitive operational steam temperature.

5. The system of claim 1, further comprising a set of emissions sensors communicatively connected to the at least one computer and fluidly connected to the power generation system, the set of emissions sensors configured to monitor emissions of the power generation system.

6. The system of claim 5, further comprising a database communicatively connected to the set of emissions sensors and the at least one computer, the database configured to store readings by the emissions sensors.

7. The system of claim 1, wherein the adjusting of the temperature of the operational steam further includes:
   determining an optimal operational steam temperature to reduce emissions based upon the emissions predictions; and
   adjusting a load on a gas turbine in the power generation system to attain the determined optimal operational steam temperature.

8. A computer program product comprising:
   a non-transitory computer readable storage medium including program code, which when executed, causes at least one computing device to adjust a temperature of an operational steam in the power generation system by performing actions including:
      obtaining operational data about components of a steam turbine in the power generation system, the operational data including at least one of: a temperature of the components and a set of current ambient conditions at the power generation system;
      determining an allowable operational steam temperature range for the steam turbine based upon the operational data;
      generating emissions predictions for a set of temperatures within the allowable steam temperature range; and
      adjusting the temperature of an operational steam in the power generation system based upon the emissions predictions.

9. The computer program product of claim 8, wherein the adjusting of the temperature of the operational steam includes adjusting an operating parameter on a gas turbine in the power generation system.

10. The computer program product of claim 8, wherein the at least one computing device is further adapted to display the emissions predictions for the set of temperatures within the allowable steam temperature range on a user interface.

11. The computer program product of claim 10, wherein the adjusting of the temperature of the operational steam further includes:
    prompting a user to select or approve of an emissions sensitive operational steam temperature via the user interface;
    receiving the selection or approval of the emissions sensitive operational steam temperature from the user via the user interface; and
    adjusting the temperature of the operational steam temperature to substantially attain the emissions sensitive operational steam temperature.

12. The computer program product of claim 8, wherein the adjusting of the temperature of the operational steam further includes:
    adjusting a load on a gas turbine in the power generation system to attain an emissions sensitive operational steam temperature;
    obtaining current emissions values from a set of emissions sensors communicatively connected to the at least one computing device and fluidly connected to the power generation system, the set of emissions sensors configured to monitor emissions of the power generation system; and
    updating the emissions predictions based upon the current emissions values.

13. The computer program product of claim 8, wherein the adjusting of the temperature of the operational steam further includes:
    determining an optimal operational steam temperature to reduce emissions based upon the emissions predictions; and
    adjusting a load on a gas turbine in the power generation system to attain the determined optimal operational steam temperature.

14. A combined cycle power generation system comprising:
    a gas turbine;
    a heat recovery steam generator (HRSG) operatively connected to the gas turbine;
    a steam turbine operatively connected to the HRSG;
    a generator operatively connected to at least one of the gas turbine or the steam turbine; and
    at least one computer communicatively connected to at least one of the gas turbine, the steam turbine and the HRSG, the at least one computer including programming, which when executed performs a function of adjusting a temperature of an operational steam in the power generation system by performing actions comprising:
       obtaining operational data about components of the steam turbine, the operational data including at least one of: a temperature of the components and a set of current ambient conditions at the power generation system;
       determining an allowable operational steam temperature range for the steam turbine based upon the operational data;
       generating emissions predictions for a set of temperatures within the allowable steam temperature range; and
       adjusting the temperature of the operational steam based upon the emissions predictions.

15. The combined cycle power generation system of claim 14, wherein the adjusting of the temperature of the operational steam includes adjusting an operating parameter on a gas turbine in the power generation system.

16. The combined cycle power generation system of claim 14, wherein the at least one computer is further adapted to display the emissions predictions for the set of temperatures within the allowable steam temperature range on a user interface.

17. The combined cycle power generation system of claim 16, wherein the adjusting of the temperature of the operational steam further includes:
    prompting a user to select or approve of an emissions sensitive operational steam temperature via the user interface;
    receiving the selection or approval of the emissions sensitive operational steam temperature from the user via the user interface; and
    adjusting the temperature of the operational steam temperature to substantially attain the emissions sensitive operational steam temperature.

18. The combined cycle power generation system of claim 14 further comprising:
    a set of emissions sensors communicatively connected to the at least one computer and fluidly connected to the power generation system, the set of emissions sensors configured to monitor emissions of the power generation system; and a database communicatively connected to the set of emissions sensors and the at least one computer, the database configured to store readings by the emissions sensors.

19. The combined cycle power generation system of claim 14, wherein the adjusting of the temperature of the operational steam further includes:

determining an optimal operational steam temperature to reduce emissions based upon the emissions predictions; and adjusting a load on a gas turbine in the power generation system to attain the determined optimal operational steam temperature.

* * * * *